(12) United States Patent
Okubo

(10) Patent No.: US 6,203,877 B1
(45) Date of Patent: Mar. 20, 2001

(54) OPTICAL INFORMATION RECORDING MEDIUM

(75) Inventor: Shuichi Okubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/299,642

(22) Filed: Apr. 27, 1999

(30) Foreign Application Priority Data

May 8, 1998 (JP) .................................................. 10-126222

(51) Int. Cl.⁷ ....................................................... B32B 3/02
(52) U.S. Cl. ........................ 428/64.1; 428/64.4; 428/64.5; 428/64.6; 428/457; 428/913; 430/270.13; 430/945; 369/275.1; 369/283; 369/288
(58) Field of Search ................................ 428/64.1, 64.2, 428/64.4, 64.5, 64.6, 457, 913; 430/270.13, 495.1, 945; 369/275.1, 275.4, 283, 288

(56) References Cited

U.S. PATENT DOCUMENTS

| 5,681,632 | * | 10/1997 | Kitaura | 428/64.1 |
| 5,965,229 | * | 10/1999 | Zhou | 428/64.1 |
| 5,978,349 | * | 11/1999 | Yoshinari | 369/275.1 |
| 6,064,642 | * | 5/2000 | Okubo | 369/275.1 |

FOREIGN PATENT DOCUMENTS

| 2-108254 | 4/1990 | (JP) . |
| 6-338085 | 12/1994 | (JP) . |
| 7-130006 | 5/1995 | (JP) . |
| 7-311980 | 11/1995 | (JP) . |

* cited by examiner

Primary Examiner—Elizabeth Evans
(74) Attorney, Agent, or Firm—McGinn & Gibb, PLLC

(57) ABSTRACT

A phase-changing optical disk solving the problem of difference in recording sensitivity between the land and groove without complexing configuration of the recording device or optical disk production scheme. The present invention provides a phase-changing optical disk including a substrate 11, provided with guiding grooves 17 to form the lands and grooves as the recording tracks, which are laminated with a first dielectric layer 12, second dielectric layer 13, recording layer 14, third dielectric layer 15 and reflection layer 16 in this order, wherein the material for the first dielectric layer 12 has a higher thermal conductivity than that for the second dielectric layer 13, and thickness of the second dielectric layer 13 is smaller than depth ds of the guiding groove 17. This accelerate thermal diffusion H2 from the both ends of the groove toward the first dielectric layer 12, decreasing recording sensitivity of the groove to a level of the land, thermal diffusion H1 from which would be otherwise larger than H2.

16 Claims, 3 Drawing Sheets

OPTICAL INFORMATION RECORDING MEDIUM

BACKGROUND OF THE INVENTION

1. Field of Invention

This invention relates to an optical information recording medium for recording and reproducing information on being irradiated with laser beams, more particularly a phase-changing optical disk recording information on a land and groove as the recording tracks formed by a guiding groove.

2. Description of the Prior Art

An optical information recording medium, in particular an optical magnetic disk and phase-changing disk, generally has recording tracks formed by concentric or spiral guiding grooves formed on the substrate. Pitch of the tracks has been decreasing to meet demands for increased recording density. One of the techniques therefor is land-groove recording in which information is recorded on both concave (groove) and convex (land) sections for each guiding groove. However, the land-groove recording method involves problems coming from difference in recording sensitivity between the land and groove sections. One of these problems is possible defective recording resulting from insufficient phase change at the side of lower recording sensitivity, when information is recorded on both sections by the same recording power. Furthermore, there occur such a problem that it is necessary to change power for recording on the land and groove, in order to realize optimum recording on each section, which makes the recording device more complex.

The above phenomenon will be explained by referring to FIG. 3, which shows a sectional view of a phase-changing optical disk. The land L and groove G, formed by the guiding groove 37 on the substrate 31, are laminated with the lower dielectric layer 33, recording layer 34, upper dielectric layer 35 and reflection layer 36, in this order. The disk is irradiated with laser beams from the substrate side, which are projected onto the land L or groove G to record information by changing phase of the recording layer 34. As shown by the sectional structure, the reflection layer 36 of high heat radiation adjoins the recording layer 34 via the groove slope on the land L, whereas the lower dielectric layer 33 of low thermal conductivity adjoins the recording layer 34 on the groove G. Therefore, thermal diffusion by heat flow H1 from the recording layer 34 towards the reflection layer 36 is accelerated at both ends of the land L, when it is irradiated with laser beams, by which is meant that a higher recording power is needed to realize phase change at the recording layer 34. This will result in lower recording density on the land L.

One method to solve the difference in recording sensitivity between the land and groove in an optical disk is changed thickness of the reflection, dielectric or recording layer on the land and groove, as disclosed by Japanese Patent Application Laid-Open No. 7-130006. This method changes thickness of the reflection or dielectric layer on the land and groove, to improve recording sensitivity on the land. The invention disclosed by Japanese Patent Application Laid-Open No. 7-311980 tries to enhance recording density, erasing rate and C/N ratio, and also to reduce crosstalk for recording with land-groove tracks by keeping reflectivity of the crystal sections of the land and groove in a range from 7 to 15%, inclusive. The invention disclosed by Japanese Patent Application Laid-Open No. 6-338085 tries to reduce erasing leftovers for magnetic modulation overwriting by keeping a higher recording density on the groove than on the land for a photomagnetic recording medium. The invention disclosed by Japanese Patent Application Laid-Open No. 2-108254 tries to reduce occurrence of erasing leftovers by keeping the metallic layer thicker on the groove than on the land, thereby reducing recording density on the groove to prevent formation of a magnetic domain on the groove and to allow a magnetic domain to be recorded on the land only when a tracking gap occurs.

BRIEF SUMMARY OF THE INVENTION

Object of the Invention

One of the methods proposed to solve the difference in recording sensitivity between the land and groove changes thickness of the reflection, dielectric or recording layer on the land and groove, as disclosed by Japanese Patent Application Laid-Open No. 7-130006. The invention disclosed by this specification changes thickness of the reflection or dielectric layer on the land and groove, in order to improve recording sensitivity of the land. However, increasing recording sensitivity of the land by, e.g., decreasing thickness of the reflection layer, causes a problem of decreased number of rewritable cycles, because of decreased heat radiation. A method is proposed to decrease recording sensitivity of the groove by increasing thickness of the recording layer over the groove. However, this requires etching of the recording layer on the land after the recording layer is deposited, making the film-making process more complex and causing other problems, such as additional necessity for securing uniformity of etching over the entire surface of the optical disk and contamination of the recording layer with the etchant gas.

It is an object of the present invention to provide an optical information recording medium which solves the problem of difference in recording sensitivity between the land and groove to realize increased density of recording capacity without changing any thickness of the recording or reflection layer on the land and groove.

SUMMARY OF THE INVENTION

The present invention provides an phase-changing optical disk, comprising a substrate laminated at least with a first dielectric layer, second dielectric layer, recording layer which changes its phase on being irradiated with laser beams, third dielectric layer and reflection layer in this order, wherein the first dielectric layer has a higher thermal conductivity than the second dielectric layer, and thickness of the second dielectric layer is smaller than depth of the guiding groove. The optical information recording medium of the present invention has the first dielectric layer of higher thermal conductivity adjoining the recording layer via the slope of the groove as the recording track, as shown in FIG. 1 which is used to explain the preferred embodiments later, to accelerate thermal diffusion from the both ends of the groove toward the first dielectric layer. As a result, recording sensitivity of the groove decreases to the level for the land. There is an acceptable range for which recording power can vary, and it is not necessary to change recording power on the land and groove, when the difference in recording sensitivity between the land and groove is sufficiently small. Although the land and groove preferably have the same optimum recording power level, but no particular problem is anticipated to result from use of the same recording power for the land and groove, when the difference in optimum recording power between the land and groove is 5% or less. It is necessary to keep thickness of the second dielectric layer smaller than depth of the guiding groove; otherwise, the recording layer will no longer adjoin the first dielectric layer in the slope, preventing groove recording sensitivity from decreasing.

Furthermore, it is preferable to use ZnS—SiO$_2$ for the second dielectric layer for the phase-changing optical disk of the present invention, from the viewpoint of its characteristics related to erasing rate and repeatability. It is also preferable that the first dielectric layer has a thermal conductivity of 1 W/m·K or more, to accelerate thermal diffusion towards the first dielectric layer, given that ZnS—SiO$_2$ has a thermal conductivity of around 0.5 W/m·K. It is possible for the conventional phase-changing optical disk, laminated with a lower dielectric layer, recording layer, upper dielectric layer and reflection layer in this order, to decrease groove recording sensitivity to an extent realized by the present invention by use of a material of high thermal conductivity for the lower dielectric layer. However, erasing rate and number of repeatable cycles strongly depend on properties of the dielectric layer adjoining the recording layer. The dielectric layer having a high thermal conductivity is not necessarily excellent in erasing rate and repeatability. The present invention can solve the difference in recording sensitivity between the land and groove, without sacrificing any characteristics related to erasing rate and repeatable cycle number, by the first and second dielectric layers, the former being characterized by high thermal conductivity while the latter by excellent in erasing rate and repeatable cycle number. It is preferable to have a totaled thickness of the first and second dielectric layers of 80 nm or more, in order to reduce thermal load on the substrate.

Furthermore, the optical disk of the present invention can use a metallic layer of a material having a high thermal conductivity, e.g., thin metallic layer, in place of the first dielectric layer. This configuration can also solve the difference in recording sensitivity between the land and groove. It is necessary, also in this case, to keep thickness of the lower dielectric layer, provided on the metallic layer, smaller than depth of the guiding groove, to allow the recording layer and metallic layer to adjoin each other via the slope in the groove.

DETAILED DESCRIPTION OF THE PREFERRED EMBODIMENTS

Figure 1:
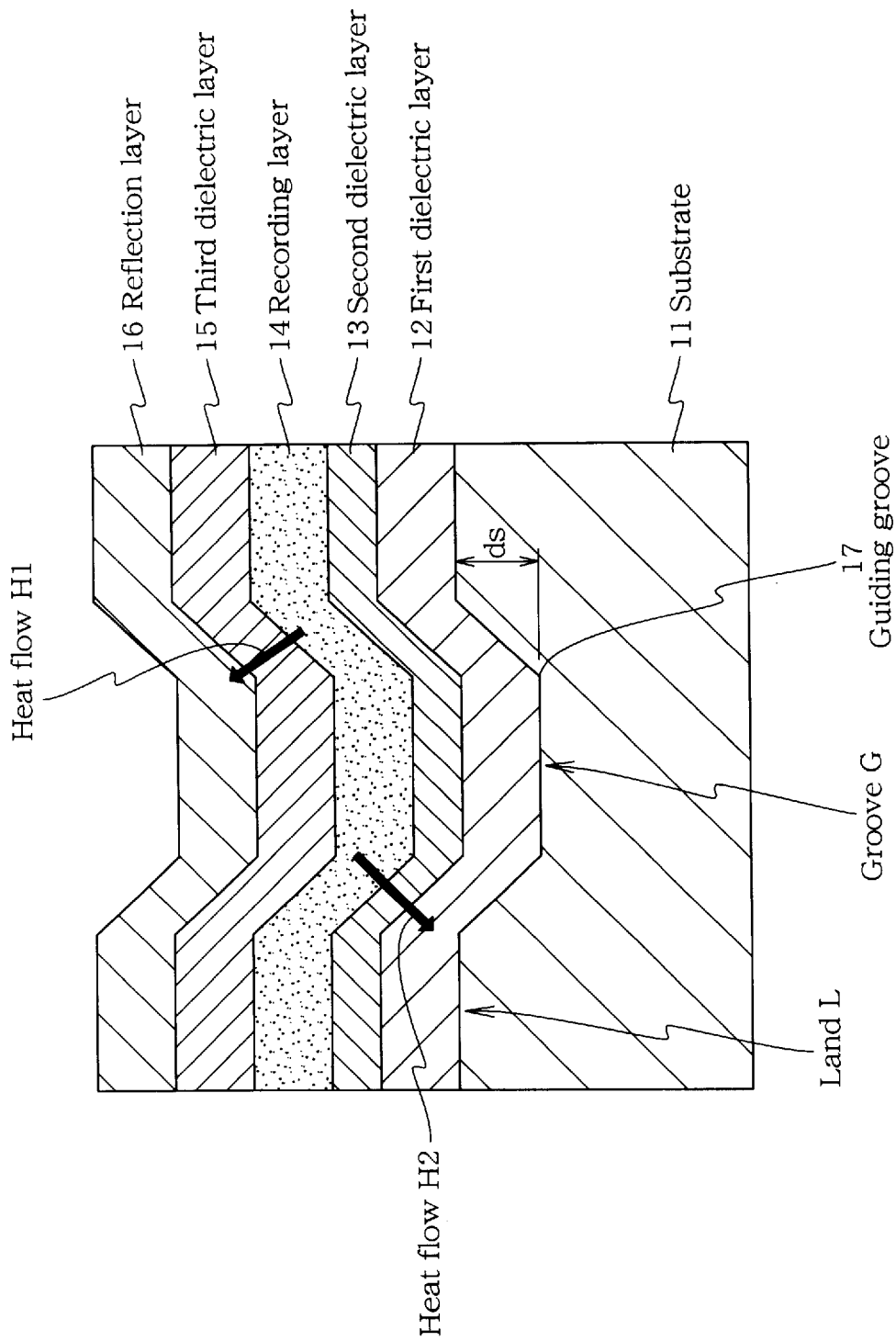
FIG. 1 is a sectional view of the configuration of the phase-changing optical disk of the first embodiment of the present invention.

The preferred embodiments of the present invention will be described by referring to the attached drawings. FIG. 1 outlines the section of the phase-changing optical disk as the first embodiment of the present invention. It comprises a light-permeable substrate 11, which is laminated with a first dielectric layer 12, second dielectric layer 13, recording layer 14 changing in phase to record information, third dielectric layer 15 and reflection layer 16 in this order. Glass and plastic resins, e.g., polycarbonate, may be used for the substrate 11. The substrate 11 is provided with concentric or spiral guiding grooves 17 for land-groove recording in which both concave (groove G) and convex (land L) sections for each guiding groove 17 work as the recording tracks. As such, the land L and groove G have virtually the same width (dimension in the radial direction), because both are responsible for information recording. Depth ds of the guiding groove 17 is generally set in a range from $\lambda/8n$ to $\lambda/2n$, for securing quality of tracking error signals and reducing crosstalk, where $\lambda$ is wavelength of the light source for recording and reproducing information, and n is refractive index of the substrate 11 at a wavelength of $\lambda$.

The suitable materials for the first dielectric layer 12 include SiN, SiO$_2$, GeN, AlN, BN, diamond-like carbon (DLC), Ta$_2$O$_5$, SiC, Al$_2$O$_3$, and mixtures thereof. Those for the second dielectric layer 13, the recording layer 14, the third dielectric layer 15 and the reflection layer 16 include ZnS—SiO$_2$, Ge$_2$Sb$_2$Te$_5$, ZnS—SiO$_2$ and Al (aluminum), respectively.

It is considered to record information on the groove of the phase-changing optical disk, shown in FIG. 1. The first dielectric layer 12 of high thermal conductivity adjoins the recording layer 14 via the slope in the groove, because thickness of the second dielectric layer 13 is smaller than depth of the guiding groove 17. Information is recorded on the recording layer 14 by the laser beams passing through the substrate 11, first dielectric layer 12 and second dielectric layer 13, where heat is diffused out of the recording layer 12 towards the reflection layer 16 denoted by heat flow H1 and also towards the first dielectric layer 12 denoted by heat flow H2, as illustrated by the arrows. As a result, recording sensitivity of the groove G decreases more in this configuration than in the conventional phase-changing optical disk with the heat flow H1 as the predominant heat flow, reducing or solving difference in recording sensitivity between the land and groove.

Figure 2:
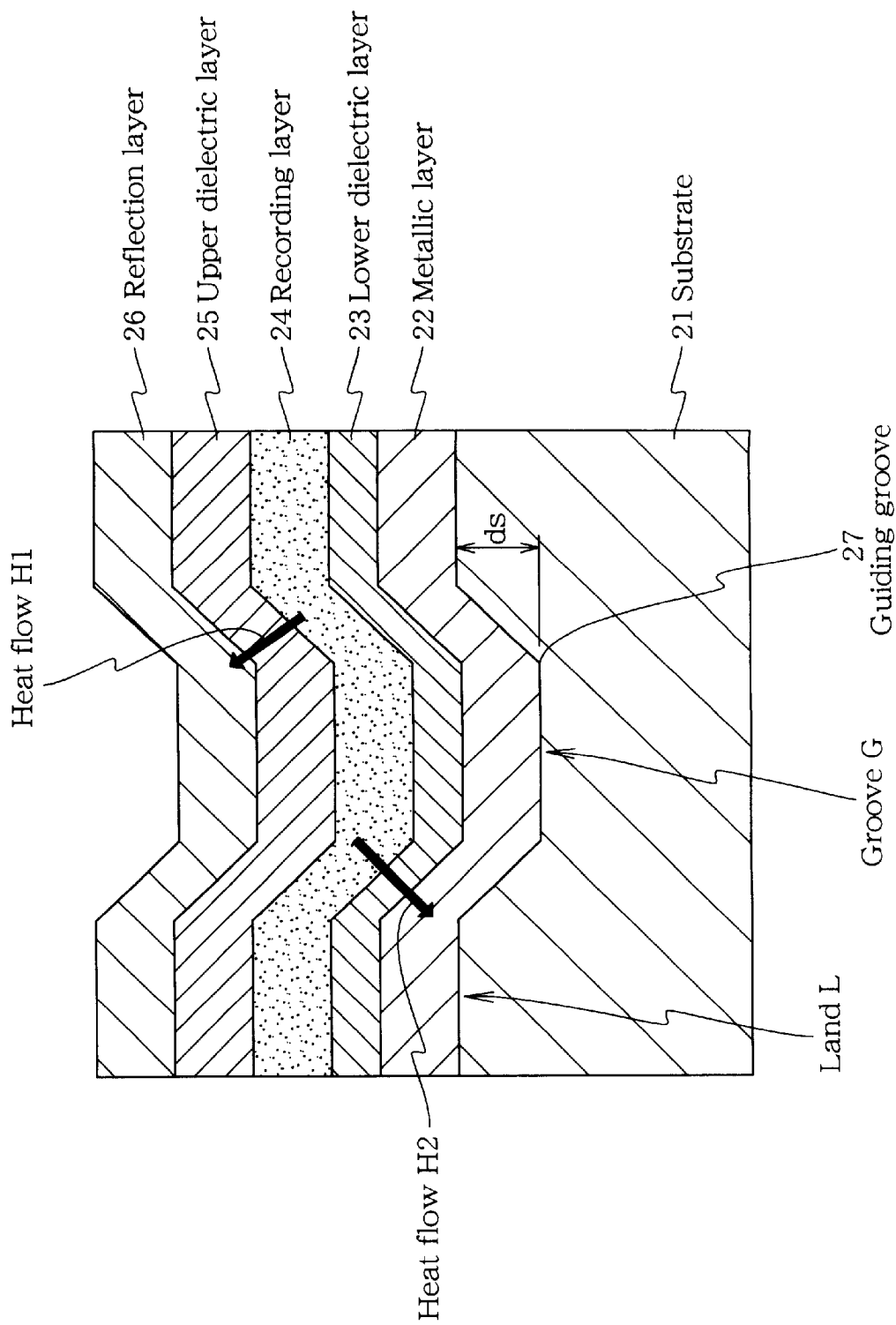
FIG. 2 is a sectional view of the configuration of the phase-changing optical disk of the second embodiment of the present invention.
Figure 3:
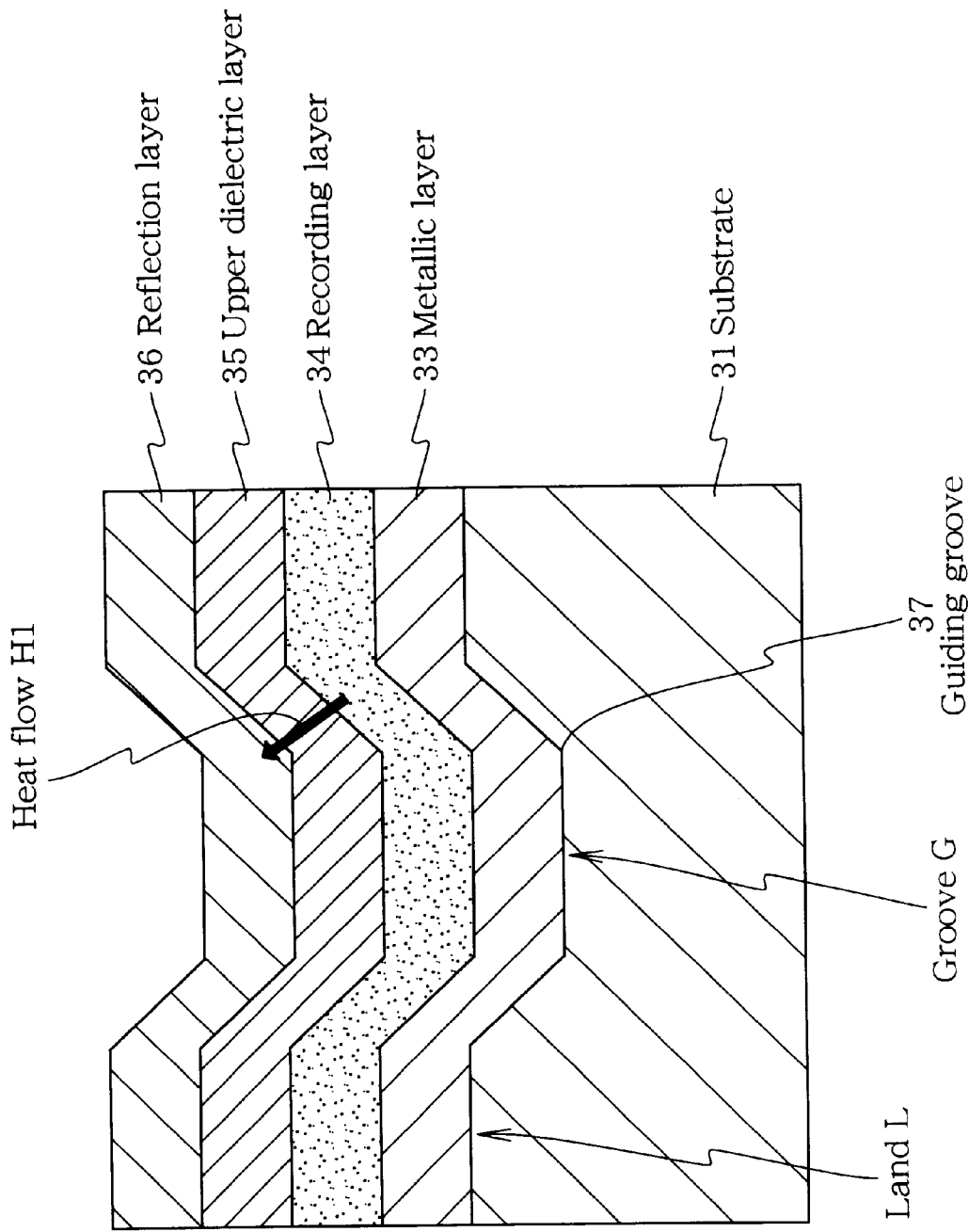
FIG. 3 is a sectional view of the configuration of the conventional phase-changing optical disk.

FIG. 2 outlines the section of the phase-changing optical disk as the second embodiment of the present invention. It comprises a light-permeable substrate 21, which is laminated with a metallic layer 22, lower dielectric layer 23, recording layer 24 changing in phase to record information, upper dielectric layer 25 and reflection layer 26 in this order. The substrate 21 is provided with guiding grooves 27 for land-groove recording in which both concave groove G and convex land L work as the recording tracks, similarly to the first embodiment. The land L and groove G have virtually the same width, and depth ds of the guiding groove 27 is set in a range from $\lambda/8n$ to $\lambda/2n$, for securing quality of tracking error signals and reducing crosstalk, where $\lambda$ is wavelength of the light source for recording and reproducing information, and n is refractive index of the substrate 11 at a wavelength of $\lambda$.

The suitable materials for the metallic layer 22 include Au, Cu, Ti, Ni, Cr, and mixtures thereof. Those for the second dielectric layer 23, recording layer 24, upper dielectric layer 25 and reflection layer 26 include ZnS—SiO$_2$, Ge$_2$Sb$_2$Te$_5$, ZnS—SiO$_2$ and Al, respectively.

It is considered to record information on the groove of the phase-changing optical disk, shown in FIG. 2. The metallic layer 22 of high thermal conductivity adjoins the recording layer 24 via the slope in the groove, because thickness of the lower dielectric layer 23 is smaller than depth of the guiding groove 27. Information is recorded on the recording layer 24 by the laser beams passing through the substrate 21, metallic layer 22 and lower dielectric layer 23, where heat is diffused out of the recording layer 24 towards the reflection layer 26 denoted by heat flow H1 and also towards the metallic layer 22 denoted by heat flow H2, as illustrated by the arrows. As a result, recording sensitivity of the groove G decreases more in this configuration than in the conventional phase-changing optical disk with the heat flow H1 as the predominant heat flow, reducing or solving difference in recording sensitivity between the land and groove.

EXAMPLES

Example 1

The optical disk prepared by Example 1 provides one embodiment of the present invention, shown in FIG. 1. It comprised a 0.6 mm thick substrate 11 of polycarbonate, which was laminated, by sputtering, with a 150 nm thick first dielectric layer 12 of $SiO_2$, second dielectric layer 13 of $ZnS$—$SiO_2$ of varying thickness as described later, 15 nm thick recording layer 14 of $Ge_2Sb_2Te_5$, 20 nm thick third dielectric layer 15 of $ZnS$—$SiO_2$ and 100 nm thick reflection layer 16 of Al, in this order. The polycarbonate substrate 11 was provided with guiding grooves 17, 1.2 μm in pitch and 60 nm in depth. Thickness of the second dielectric layer 13 of $ZnS$—$SiO_2$ was changed in a range from 20 to 80 nm. $SiO_2$ which constituted the first dielectric layer 12 has a sufficiently higher thermal conductivity than $ZnS$—$SiO_2$ which constituted the second dielectric layer 13, 1.41 versus 0.58 W/m·K.

The optical disk was rotated at a linear velocity of 6 m/s, and tested using an optical head working under conditions of 660 nm as wavelength and 0.6 as numerical aperture of the objective lens, where signals of 1 MHz were recorded both on the land and groove at a duty of 50%, to determine the optimum recording power for each section. The optimum recording power is defined as the power which minimizes the ratio of the carrier component of signals of 1 MHz to the secondary harmonic distortion component. Table 1 gives the relationship between the optimum recording power and selected thickness of the second dielectric layer 13. The difference in the optimum recording power between the land and groove was 5% or more, when thickness of the second dielectric layer 13 was equal to depth ds=60 nm of the guiding groove 17. However, the difference became lower than 5%, as thickness of the second dielectric layer 13 decreased from 60 nm as depth of the guiding groove. The land and groove had the same recording sensitivity, when thickness of the second dielectric layer 13 was 20 to 40 nm. As shown in Table 1, recording power of the land varies depending on thickness of the second dielectric layer 13, because of absorptivity of the recording layer 14 changing with thickness of the second dielectric layer 13.

TABLE 1

| | Thickness of the second dielectric layer | | | | |
|---|---|---|---|---|---|
| | 20 nm | 40 nm | 50 nm | 60 nm | 80 nm |
| Optimum recording power of the land | 7.3 mW | 7.2 mW | 7.2 mW | 7.0 mW | 7.0 mW |
| Optimum recording power of the groove | 7.3 mW | 7.2 mW | 6.9 mW | 6.5 mW | 6.3 mW |
| Difference | 0 | 0 | 0.3 | 0.5 | 0.7 |
| Percentage of the difference on optimum recording power of the land | 0 | 0 | 4.3% | 7.7% | 11% |

Example 2

The optical disk prepared by Example 2 provides another embodiment of the present invention, shown in FIG. 1. It comprised a 0.6 mm thick substrate 11 of polycarbonate, which was laminated, by sputtering, with a 100 nm thick first dielectric layer 12 of SiN, second dielectric layer 13 of $ZnS$—$SiO_2$ of varying thickness, 15 nm thick recording layer 14 of $Ge_2Sb_2Te_5$, 20 nm thick third dielectric layer 15 of $ZnS$—$SiO_2$ and 100 nm thick reflection layer 16 of Al, in this order. The polycarbonate substrate 11 was provided with guiding grooves 17, 1.2 μm in pitch and 80 nm in depth. Thickness of the second dielectric layer 13 of $ZnS$—$SiO_2$ was changed in a range from 40 to 100 nm. SiN which constituted the first dielectric layer 12 has a sufficiently higher thermal conductivity than $ZnS$—$SiO_2$ which constituted the second dielectric layer 13, 1.6 versus 0.5 W/m·K.

The optical disk was rotated at a linear velocity of 6 m/s, and tested using an optical head working under conditions of 660 nm as wavelength and 0.6 as numerical aperture of the objective lens, where signals of 1 MHz were recorded both on the land and groove at a duty of 50%, to determine the optimum recording power for each section, in a manner similar to that for Example 1. Table 2 gives the relationship between the optimum recording power and selected thickness of the second dielectric layer 13. The difference in the optimum recording power between the land and groove was 5% or more, when thickness of the second dielectric layer 13 was equal to depth ds=80 nm of the guiding groove 17. However, the difference became lower than 5%, as thickness of the second dielectric layer 13 decreased from 80 nm as depth of the guiding groove. The land and groove had the same recording sensitivity, when thickness of the second dielectric layer 13 was 40 to 60 nm.

TABLE 2

| | Thickness of the second dielectric layer | | | | |
|---|---|---|---|---|---|
| | 40 nm | 60 nm | 70 nm | 80 nm | 1000 nm |
| Optimum recording power of the land | 8.3 mW | 8.2 mW | 8.2 mW | 8.0 mW | 8.0 mW |
| Optimum recording power of the groove | 8.3 mW | 8.2 mW | 7.9 mW | 7.5 mW | 7.3 mW |
| Difference | 0 | 0 | 0.3 | 0.5 | 0.7 |
| Percentage of the difference on optimum recording power of the land | 0 | 0 | 3.8% | 6.7% | 9.6% |

Example 3

The optical disk prepared by Example 3 provides still another embodiment of the present invention, shown in FIG. 2. It comprised a 0.6 mm thick substrate 21 of polycarbonate, which was laminated, by sputtering, with a 10 nm thick metallic layer 22 of Au, lower dielectric layer 23 of $ZnS$—$SiO_2$ of varying thickness as described later, 13 nm thick recording layer 24 of $Ge_1Sb_2Te_4$, 20 nm thick upper dielectric layer 25 of $ZnS$—$SiO_2$ and 100 nm thick reflection layer 26 of Al, in this order. The polycarbonate substrate 21 was provided with guiding grooves 27, 1.2 μm in pitch and 60 nm in depth. Thickness of the second dielectric layer 23 of $ZnS$—$SiO_2$ was changed in a range from 20 to 80 nm. Au which constituted the first dielectric layer 22 has a sufficiently higher thermal conductivity than $ZnS$—$SiO_2$ which constituted the second dielectric layer 23, 150 versus 0.5 W/m·K.

The optical disk was rotated at a linear velocity of 6 m/s, and tested using an optical head working under conditions of 660 nm as wavelength and 0.6 as numerical aperture of the objective lens, where signals of 1 MHz were recorded both on the land and groove at a duty of 50%, to determine the optimum recording power for each section, in a manner similar to that for Example 1 and 2. Table 3 gives the relationship between the optimum recording power and selected thickness of the lower dielectric layer 23. The difference in the optimum recording power between the land and groove was 5% or more, when thickness of the lower dielectric layer 23 was equal to depth ds=60 nm of the guiding groove 27. However, the difference became lower than 5%, as thickness of the second dielectric layer 23 decreased from 80 nm as depth of the guiding groove. The land and groove had the same recording sensitivity, when thickness of the second dielectric layer 23 was 20 to 40 nm.

TABLE 3

| | Thickness of the second dielectric layer | | | | |
|---|---|---|---|---|---|
| | 20 nm | 40 nm | 50 nm | 60 nm | 80 nm |
| Optimum recording power of the land | 9.2 mW | 9.2 mW | 9.2 mW | 9.0 mW | 9.0 mW |
| Optimum recording power of the groove | 9.2 mW | 9.2 mW | 9.0 mW | 8.5 mW | 8.3 mW |
| Difference | 0 | 0 | 0.2 | 0.5 | 0.7 |
| Percentage of the difference on optimum recording power of the land | 0 | 0 | 2.2% | 5.9% | 8.4% |

As described above, the present invention provides a phase-changing optical disk comprising a substrate, provided with guiding grooves to form the lands and grooves as the recording tracks, which are laminated with a first dielectric layer, second dielectric layer, recording layer, third dielectric layer and reflection layer in this order, wherein the first dielectric layer has a higher thermal conductivity than the second dielectric layer, and thickness of the second dielectric layer is smaller than depth of the guiding groove. This configuration allows thermal diffusion from the land to be kept on a level with that from the groove, securing virtually the same recording sensitivity on the land and groove. This eliminates necessity for having different recording power on the land and groove, simplifies configuration of the recording/reproducing devices, eliminates necessity for changing thickness of the recording or reflection layer, and hence allows the optical disk to be produced easily. Keeping totaled thickness of the first and second dielectric layers of 80 nm or more reduces thermal load on the substrate, thereby extending serviceability of the optical disk. Use of $ZnS$—$SiO_2$ for the second dielectric layer prevents its erasing capacity and repeatability from being deteriorated. Use of the metallic layer in place of the first dielectric layer, as one of the embodiments of the present invention, also brings about the effect of securing virtually the same thermal diffusion from the recording layer on the land and groove and hence the same recording sensitivity on the land and groove.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-126222 (Filed on May $8^{th}$, 1998) including specification, claims, drawings and summary are incorporated herein by reference in its entirety.

What is claimed is:

1. An optical information recording medium comprising:
   a light-permeable substrate provided with guiding grooves, which is laminated with a first dielectric layer, a second dielectric layer, a recording layer which changes its phase upon being irradiated with laser beams, a third dielectric layer and a reflection layer in this order, the recording layer and the first dielectric layer adjoin each other,
   wherein each guiding groove on the substrate has a concave and a convex section, and wherein both of the concave and the convex section record information,
   wherein the first dielectric layer has a higher thermal conductivity than the second dielectric layer, and
   wherein the second dielectric layer has a thickness smaller than a depth of the guiding groove.

2. The optical information recording medium according to claim 1, wherein said recording layer and said first dielectric layer adjoin each other in the convex section of each of said guiding grooves.

3. The optical information recording medium according to claim 1, wherein the totaled thickness of said first and second dielectric layers is 80 nm or more.

4. The optical information recording medium according to claim 2, wherein the totaled thickness of said first and second dielectric layers is 80 nm or more.

5. The optical information recording medium according to claim 1, wherein $ZnS$—$SiO_2$ is used for said second dielectric layer, and said first dielectric layer has a thermal conductivity $\lambda 1$ of 1 W/m·K or more.

6. The optical information recording medium according to claim 3, wherein $ZnS$—$SiO_2$ is used for said second dielectric layer, and said first dielectric layer has a thermal conductivity $\lambda 1$ of 1 W/m·K or more.

7. The optical information recording medium according to claim 4, wherein $ZnS$—$SiO_2$ is used for said second dielectric layer, and said first dielectric layer has a thermal conductivity $\lambda 1$ of 1 W/m·K or more.

8. An optical information recording medium comprising:
   a light-permeable substrate provided with guiding grooves, which is laminated with a metallic layer, a lower dielectric layer, a recording layer which changes its phase upon being irradiated with laser beams, an upper dielectric layer and a reflection layer in this order, the recording layer adjoining the lower dielectric,
   wherein each guiding groove on the substrate has a concave and a convex section, and wherein both of the concave and the convex section record information,
   and wherein the lower dielectric layer has a thickness smaller than a depth of the guiding groove.

9. The optical information recording medium according to claim 5, wherein said recording layer and said first dielectric layer adjoin each other in the convex section of each of said guiding grooves.

10. The optical information recording medium according to claim 8, wherein $ZnS$—$SiO_2$ is used for said lower dielectric layer.

11. The optical information recording medium according to claim 9, wherein $ZnS$—$SiO_2$ is used for said lower dielectric layer.

12. An optical information recording medium comprising:
   a light-permeable substrate provided with guiding grooves, which is laminated with a first dielectric layer, a second dielectric layer, a recording layer which changes its phase upon being irradiated with laser beams, a third dielectric layer and a reflection layer in this order, the recording layer and the first dielectric layer adjoin each other at the convex section of each of the guiding grooves, each guiding groove on the substrate has a concave and a convex section, and wherein both of the concave and the convex section record information, wherein the first dielectric layer which has a higher thermal conductivity than the second dielectric layer, and wherein the second dielectric layer has a thickness smaller than a depth of the guiding groove.

13. The optical information recording medium according to claim 12, wherein the total thickness of said first and second dielectric layers is 80 nm or more.

14. The optical information recording medium according to claim 12, wherein $ZnS$—$SiO_2$ is used for said second dielectric layer, and said first dielectric layer has a thermal conductivity $\lambda 1$ of 1 W/m·K or more.

15. The optical information recording medium according to claim 12, wherein $ZnS$—$SiO_2$ is used for said lower dielectric layer.

16. The optical information recording medium according to claim 14, wherein $ZnS$—$SiO_2$ is used for said lower dielectric layer.

* * * * *